United States Patent
Verma

(10) Patent No.: US 6,243,750 B1
(45) Date of Patent: *Jun. 5, 2001

(54) METHOD AND SYSTEM FOR MEASURING WEB SITE ACCESS REQUESTS

(75) Inventor: Dinesh Chandra Verma, Millwood, NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/048,773

(22) Filed: Mar. 26, 1998

(51) Int. Cl.[7] .................................................. G06F 13/00
(52) U.S. Cl. ......................................... 709/224; 709/203
(58) Field of Search ................................. 709/217, 203, 709/219, 234, 229, 226, 218, 224; 707/5, 10, 7; 395/427; 705/14; 340/825.44; 345/333; 342/44; 711/209; 235/375

(56) References Cited

U.S. PATENT DOCUMENTS

| | | | |
|---|---|---|---|
| 4,752,675 | * 6/1988 | Zetmeir | 235/375 |
| 5,446,862 | * 8/1995 | Ohkami | 395/427 |
| 5,649,142 | * 7/1997 | Lavelle et al. | 711/209 |
| 5,793,972 | * 8/1998 | Shane | 709/219 |
| 5,812,776 | * 9/1998 | Gifford | 709/217 |
| 5,870,550 | * 2/1999 | Wesinger, Jr. et al. | 709/218 |
| 5,884,038 | * 3/1999 | Kapoor | 709/226 |
| 5,898,833 | * 4/1999 | Kidder | 709/234 |
| 5,929,801 | * 7/1999 | Aslanidis et al. | 342/44 |
| 5,933,811 | * 8/1999 | ANgles et al. | 705/14 |
| 5,933,827 | * 8/1999 | Cole et al. | 707/10 |
| 5,935,207 | * 8/1999 | Logue et al. | 709/219 |
| 5,943,670 | * 8/1999 | Prager | 707/5 |
| 5,948,061 | * 9/1999 | Merriman et al. | 709/219 |
| 5,959,623 | * 9/1999 | Van Hoff et al. | 345/333 |
| 5,960,409 | * 9/1999 | Wexler | 705/14 |
| 5,961,603 | * 10/1999 | Kunkel et al. | 709/229 |
| 5,995,965 | * 11/1999 | Experton | 707/10 |
| 5,999,912 | * 12/1999 | Wodarz et al. | 705/14 |
| 5,999,929 | * 12/1999 | Goodman | 707/7 |
| 6,009,410 | * 12/1999 | LeMole et al. | 705/14 |
| 6,016,107 | * 1/2000 | Kampe et al. | 340/825.44 |

* cited by examiner

Primary Examiner—Robert B. Harrell
Assistant Examiner—Thong Vu
(74) Attorney, Agent, or Firm—Fleit, Kain, Gibbons, Gutman & Bongini P.L.; Jon A. Gibbons; Casey P. August

(57) ABSTRACT

A method and apparatus for determining a referring entity for an access request for a node in a network comprises a plurality of nodes, wherein each node is identified by a unique address and each node comprises the capability for including sub-addresses. The method comprises the steps of: receiving a request for an address in the network, the request including a request for a sub-address within the node identified by the address; removing the sub-address from the request; comparing the sub-address received with a list of sub-addresses, each corresponding to a referring entity; and determining the referring entity corresponding to the request for an address based on the comparison.

27 Claims, 6 Drawing Sheets

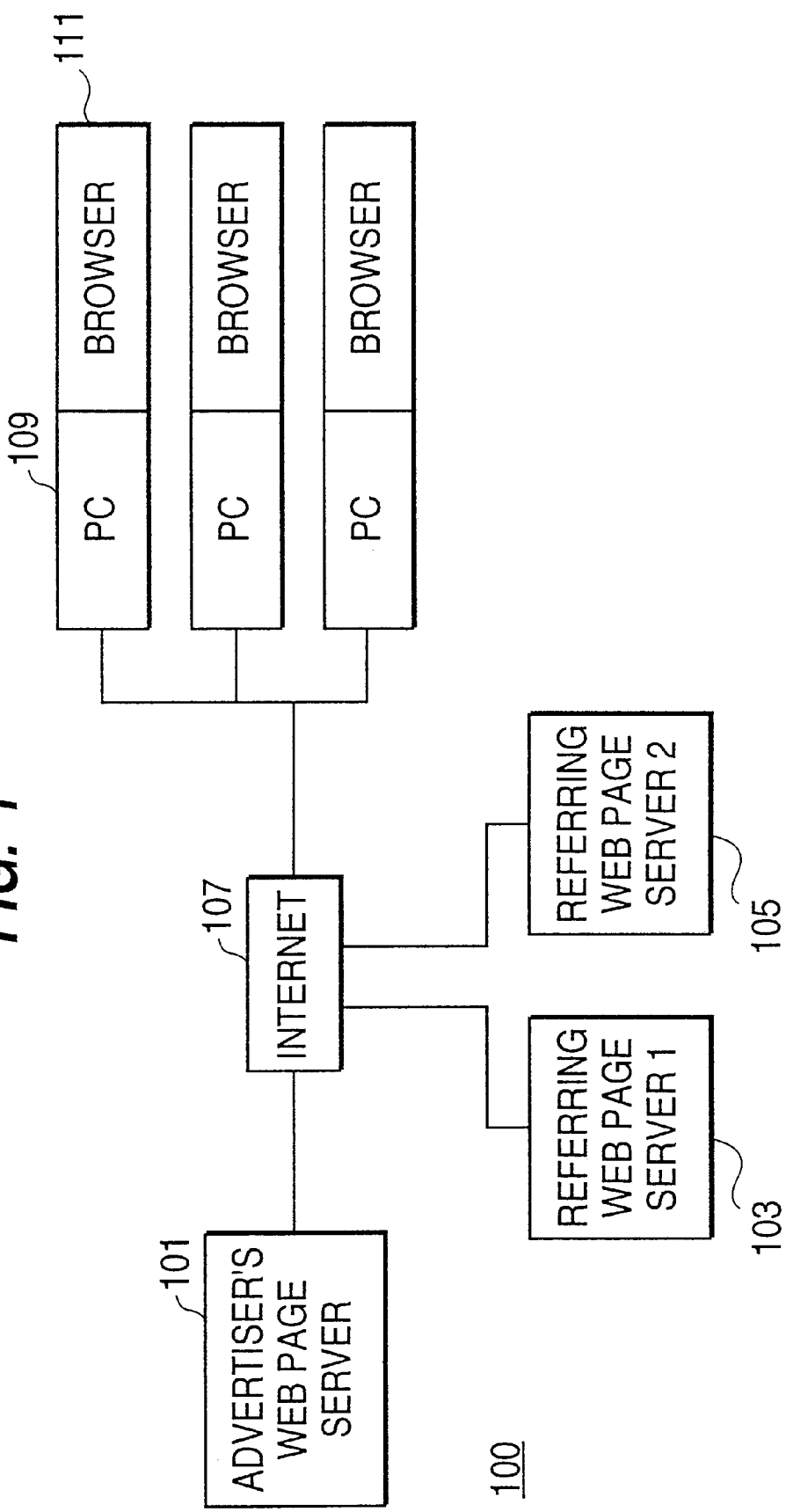

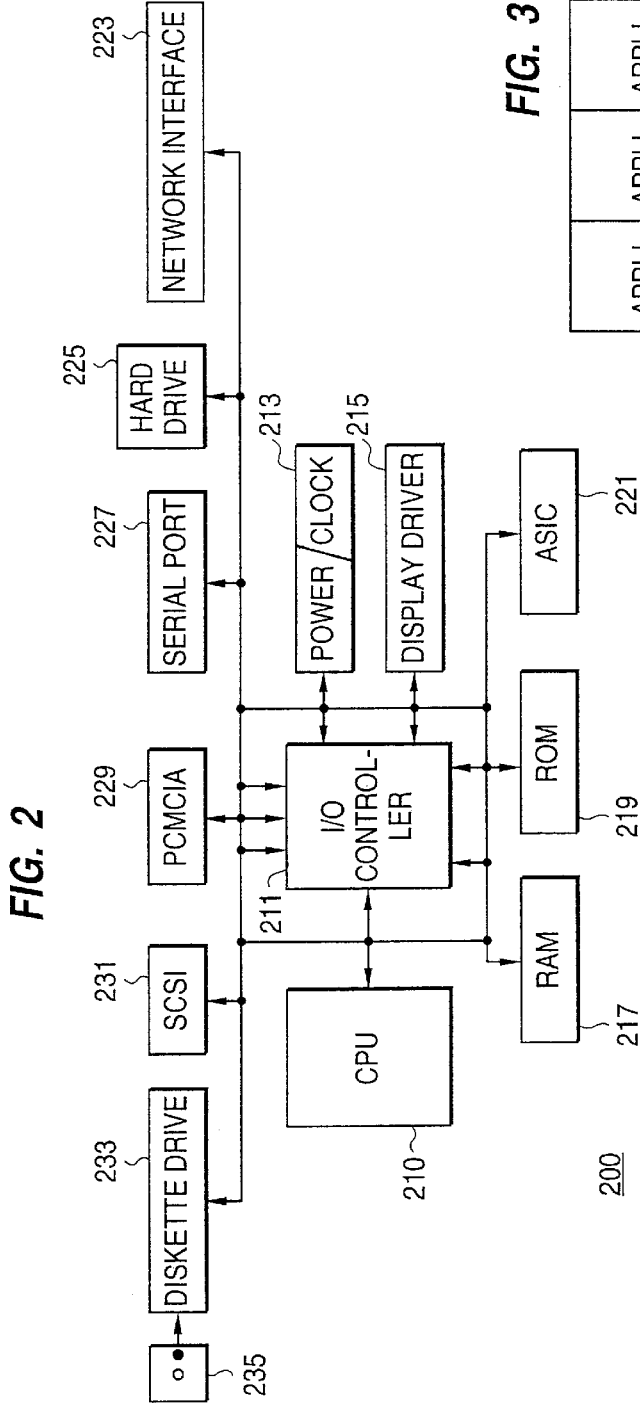

FIG. 7

<IMG SRC=bicycle.gif><A HREF="http://www.bike_sales.com/alias/www.source.com/unalias">

<IMG SRC=bicycle.gif><A HREF="http://www.bike_sales.com/alias/www.source.com">

<IMG SRC=bicycle.gif>
<A HREF="http://www.bike_sales.com/main.html">

908

OR

<IMG SRC=bicycle.gif>
<A HREF="http://www.bike_sales.com/top.html">

909

METHOD AND SYSTEM FOR MEASURING WEB SITE ACCESS REQUESTS

CROSS-REFERENCE TO RELATED APPLICATIONS

Not applicable.

BACKGROUND OF THE INVENTION

1. Field of the Invention

The invention disclosed broadly relates to the field of computer networks, and more particularly relates to the field of measuring the effectiveness of advertisement on a World Wide Web site by gauging the number of visits (or "hits").

2. Description of the Related Art

The World-Wide-Web ("Web") has become immensely popular largely because of the ease of finding information and the user-friendliness of today's browsers. A feature known as hypertext allows a user to access information from one Web page to another by simply pointing (using a pointing device such as a mouse) at the hypertext and clicking. Another feature that makes the Web attractive is having the ability to process the information (or content) in remote Web pages without the requirement of having a specialized application program for each kind of content accessed. Thus, the same content is viewed across different platforms. Browser technology has evolved to enable running of applications that manipulate this content across platforms.

The Web relies on an interpretative scripting language called HTML (Hyper Text Mark Up Language) which is capable of rendering text, graphics, images, audio, real-time video, etc. on a Web compliant browser. HTML is independent of client operating systems. So HTML renders the same content across a wide variety of software and hardware operating platforms. Software platforms include Windows 3.1, Windows NT, Apple's Copeland and Macintosh, and IBM's AIX and OS/2, HP Unix, etc. Popular compliant Web-Browser includes Microsoft's Internet Explorer, Netscape Navigator, Lynx and Mosaic. HTML interprets links to files, images, sound clips, etc. through the use of hypertext links. Upon user invocation of a hypertext link to a Web page, the browser initiates a network request to receive the desired Web page.

Advertisement on the Web is typically delivered on Web Pages in static or animated areas called banners. These banners are generally used on various popular Web sites. One common type of Web site for third party advertisement is on search engines Web sites such as AltaVista, Lycos, Excite, and Yahoo. Advertisers pay for advertisement space on these Web sites.

Advertisers on the Web, like advertisers in other media such as print, radio, or television, want to gauge the effectiveness of their advertisement. A common measure of advertisement effectiveness is to measure how large an audience the advertisement has reached. Newspapers can supply subscription information for different markets served. In the case of television, Nielsen ratings and other reliable third party measurement systems exist to determine viewership. Analogously, advertisers on the Web desire to determine the number of "hits" or selections their advertisement received on a given Web page. As with advertisements in other media, advertisers using the Web only desire to keep using advertising that generates an acceptable number of "hits."

The mechanism used to collect statistics on Web sites is called CGI (common gateway interface), which is a standard for interfacing external applications with information servers, such as Web servers or HTTP (hyper-text-transfer-protocol) servers. A program, called a CGI script, written to the CGI standard is invoked when a Web browser user selects an advertisement usually by "clicking" with a mouse. The CGI script runs on the Web server and transmits the selection information to a database. Later the database can be examined to report the number of "hits" corresponding advertisement on the Web server received. The cost of advertisement space on a Web page is directly related to the popularity or number of "hits" the each Web site receives. There is a motivation for Web site providers and advertising agencies to inflate the popularity of a Web site in order to sell advertising space. This motivation of inflating the popularity of a Web site owner on one side and the advertiser on the other creates an atmosphere of mistrust. In other advertisement media, such as television, there are provided third party systems such as Nielsen ratings that provide statistics on the audience size. In Web based advertising, no trusted independent third party mechanism exists, therefore a need exists to provide a method and apparatus to measure "hit" rates on Web sites.

In trying to determine the number of "hits" on a particular Web site, advertisers have HTTP options to track requests. The HTTP specification on which the communications between Web sites across the Web is based includes a feature to carry the referring Web page which resulted in the access of the current Web site. The referring page feature is a chronology option for revealing which Web page "linked to" or referenced the current page. This referring Web page feature is completely optional. Therefore, this referring Web page option may not be implemented on a given brand of Web browser. Therefore a need exists to measure requests for Web site advertisement where this referring Web page option in the HTML specification is not implemented or supported.

Another problem that exists when using the referring page option results from Web advertisers using third party advertisement agencies to purchase advertisement space on Web sites. Advertisers on the Web, as in other media, such as print, radio or television, often make use of third party advertising agencies to buy advertisement space. Advertising agencies manage the contractual requirements for buying advertisement space on selected Web pages. Turning to an example, suppose Company A desires to place its advertisement on another company's Web site, call it Company C, and Company A engages a third company, Company B, a Web advertising agency to act as an intermediary. If Company B, the adverting agency, uses the HTTP referring page option when placing Company A's advertisement on Company C's Web page, the referring page is actually Company C. Unless Company A monitors and tracks every advertisement sold by Company B to Company C's Web site, it will be difficult for Company A to measure the effectiveness of its advertisement on Company C's Web site. Accordingly, a need exists to measure hits on a Web site when using an advertising agency without the requirement to constantly engage the advertiser. The problem of referring pages is compounded when a company advertises on several sites concurrently. The advertisers may not even know the advertising agency placed advertisement on a given site. It is not unusual for large volume Web advertisers such as Microsoft or IBM to have their advertisement displayed on many different sites concurrently to reach a large audience. Therefore a need exist to provide reliable measurement of advertisement effectiveness on the Web when using third party advertising agencies.

SUMMARY OF THE INVENTION

Briefly, in accordance with the invention, in a network comprising a plurality of nodes wherein each node is identified by a unique address and each node comprises the capability for including sub-addresses, a method for determining a referring entity for an access request for a node in a network, comprises the steps of: receiving a request for an address in the network, the request including a request for a sub-address within the node identified by the address; removing the sub-address from the request; comparing the sub-address received with a list of sub-addresses, each corresponding to a referring entity; and determining the referring entity corresponding to the request for an address based on the comparison.

BRIEF DESCRIPTION OF THE DRAWINGS

FIG. 1 is a functional block diagram of a computer data network for an advertiser's Web page server and one or more referring Web page servers according to the present invention.

FIG. 2 is a block diagram of the major electrical components of a data processing system for hosting Web pages according to FIG. 1.

FIG. 3 is a block diagram of the software and hardware hierarchy of the major elements of Web page server for hosting Web pages according to FIG. 2.

FIG. 7 is an illustration of an alternate embodiment of FIG. 6 for HTML code used to reference a Web site according to the present invention.

FIG. 8 is an illustration of an alternate embodiment of FIG. 6 for HTML code used to reference a Web site according to the present invention.

FIG. 9 is an illustration of an alternate embodiment of FIG. 6 for HTML code used to reference a Web site according to the present invention.

DETAILED DESCRIPTION OF AN EMBODIMENT

Figure 4:
FIG. 4 is an illustration of a Web browser displaying an example Web Page on the World-Wide-Web according to the present invention.

FIG. 1 is a functional block diagram depicting a computer data network 100 including an advertiser's Advertiser's Web page server 101 and one or more referring Web page servers 103 and 105 according to the present invention. Advertiser's Web page server 101 and referring Web page servers 103 and 105 are connected to the Internet 107. A plurality of end-user data processing systems 109 each with a Web browser 111 are connected to the Internet 107. Web browser 111 comprises client software programs based upon an HTTP (Hyper-Text-Transfer-Protocol) compatible product such as Netscape Navigator, Sun Hot JAVA Browser or Microsoft Internet Explorer. It is important to point out that the precise operating systems and hardware configurations of advertiser's Web page server 101, and Web-browser 111 are not limited to any specific hardware or software configuration. Units 109 can be a personal computer or any other information processing apparatus suitable for communicating with the Web.

A person (e.g. an advertiser) wishing to use the Internet to advertise products has a Web site resident at advertiser web page server 101. That person uses the services (e.g. advertising) of referring Web page servers 103 and 105. Persons using PC units 109 have access to references (e.g. ads) to server 101 made by referring Web page servers 103 and 105. In accordance with the invention, the advertiser can determine whether any given visit to her advertising Web server 101 by referring Web page servers 103 and 105. In accordance with the invention, the advertiser can determine whether any given visits to her server 101 was referred by referring Web page server 103 or referring Web page server 105.

Referring to FIG. 2, there is shown a block diagram of the major electrical components of a computer system 200 used in accordance with this invention. The electrical components include: a central processing unit (CPU) 210, an Input/Output (I/O) Controller 211, a system power and clock source 213; display driver 215; RAM 217; ROM 219; ASIC (application specific integrated circuit) 221 and a hard disk drive 225. These are representative components of a computer. The operation of a computer comprising these elements is well understood. Network interface 223 provides connection to a computer network such as Ethernet, TCP/IP or other popular protocol network interfaces. Optional components for interfacing to external peripherals include: a Small Computer Systems Interface (SCSI) port 231 for attaching peripherals; a PCMCIA slot 229; and serial port 227. An optional diskette drive 233 is shown for loading or saving code to removable diskettes 235. The system 200 may be implemented by combination of hardware and software. Moreover, the functionality required for using the invention may be embodied in computer-readable media (such as 3.5 inch diskette 235) to be used in programming an information-processing apparatus (e.g., a personal computer) to perform in accordance with the invention.

FIG. 3 shows software hierarchy 300 of the major elements of Web page server 200 for hosting Web pages. Major software components running on Web page hardware 310 include, devices drivers 311, operating system 313 and a plurality of application programs 315. Computer system 200 can run any commercially available operating system including DOS, Windows 3.1, Windows 95, Windows NT, Unix, AIX, Solaris or other proprietary operating systems. The application programs 315 can be written using a variety of programming languages including Visual Basic, C/C++, assembler or any other programing tools.

Referring now to FIG. 4, there is shown a typical Web browser displaying an example Web Page 400 on the Web according to the present invention. An example advertisement is shown in an online Yellow Pages directory listing 410 service rendered on Web browser 111 of FIG. 1. Web page 400 shows the results for an example keyword query of "computer". Advertisement 411 is an example of an ad for bicycle roof racks. In the prior art system, when a user selects this ad by clicking on the advertisement with a mouse button, the HTML reference link URL associated with this image is requested.

Figure 5:
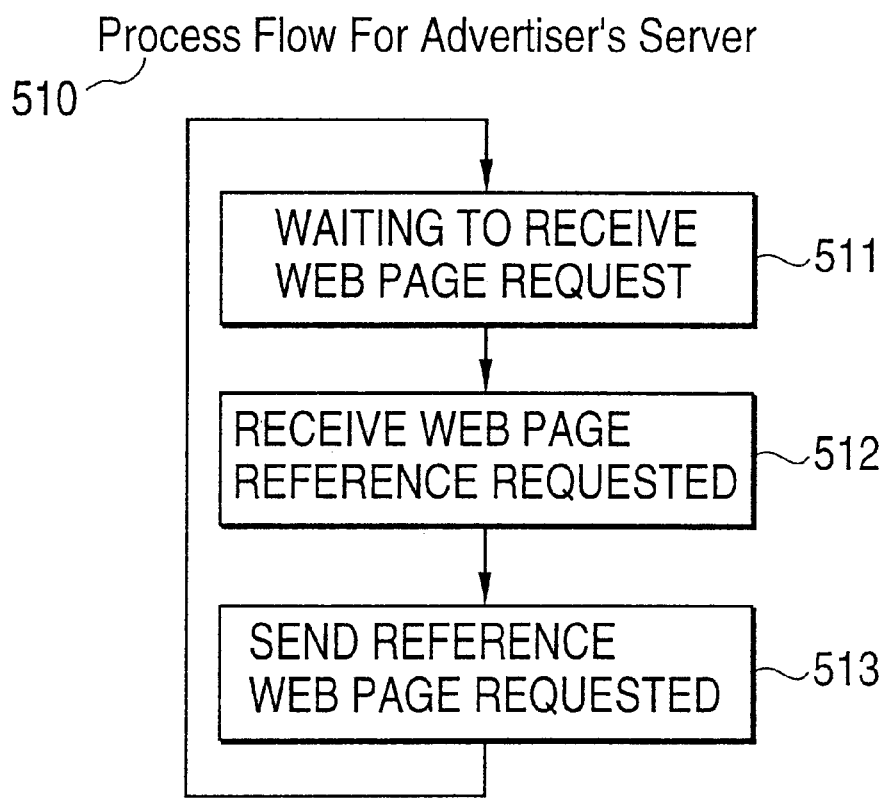
FIG. 5 is an illustration of a prior art reference link. In addition, the associated process flow of the prior art HTML code is illustrated.

FIG. 5 is an illustration of a prior art reference link for referencing an advertiser's Web site using HTML code 500. In addition, the associated process flow 510 of the prior art HTML code is illustrated. In this example, the image source file 501 for the bicycle advertisement 411 in FIG. 4 is a standard GIF file called bicycle.gif. The HTML code 505 <A HREF= provides the link to advertiser's Web site 507 when advertisement 411 is selected by the user. In this case the advertiser's Web site 507 is located at the URL address of http://www.bike_sales.com.

As previously discussed, it is very common on the Web, as in other advertising media, for advertisers to advertise on two or more Web sites simultaneously. The two hosting Web sites in FIG. 1 are referring Web page server 103 and referring Web page server 105. Each of these referring Web sites 103 and 105 can arrange the placement of advertisement 411 according to the style of the particular service offered. In this example advertisement 411 is displayed on a yellow page directory service for reference Web page server 103. It would be common for reference Web page server 105 to host a completely different type of service such as an Internet search engine service and display the same advertisement 411. Moreover, each reference Web page server may target different audiences and each reference Web page server may be owned by separate entities.

A simplified process flow chart 510 of an application 315 running on Advertiser's Web page server 101 is shown. Assume in this process flow example that the user is viewing a yellow page directory listing 410 being hosted by referring Web page server 103. Referring Web page server 103 requests the URL address of advertiser's Web site 507. The advertiser's Web site 507 is running on Advertiser's Web page server 101. The process begins with application 315 waiting to receive an advertiser's Web page request (step 511). When an advertiser's Web page server 101 receives (step 512) an advertiser Web site 507 request, application 315 sends (step 513) the corresponding advertiser's Web page back to Web browser 111 on client PC 109. The application 315 in this example does not track where the request for advertiser's Web page 507 originated. The request could have originated from the advertisement placed on any of several referring Web page servers 103 and 105 or from the user directly addressing the advertiser's Web page server. The advertiser is therefore unable to differentiate between the relative effectiveness of advertisement 411 when placed on these two referring Web servers 105 and 107.

Figure 6:
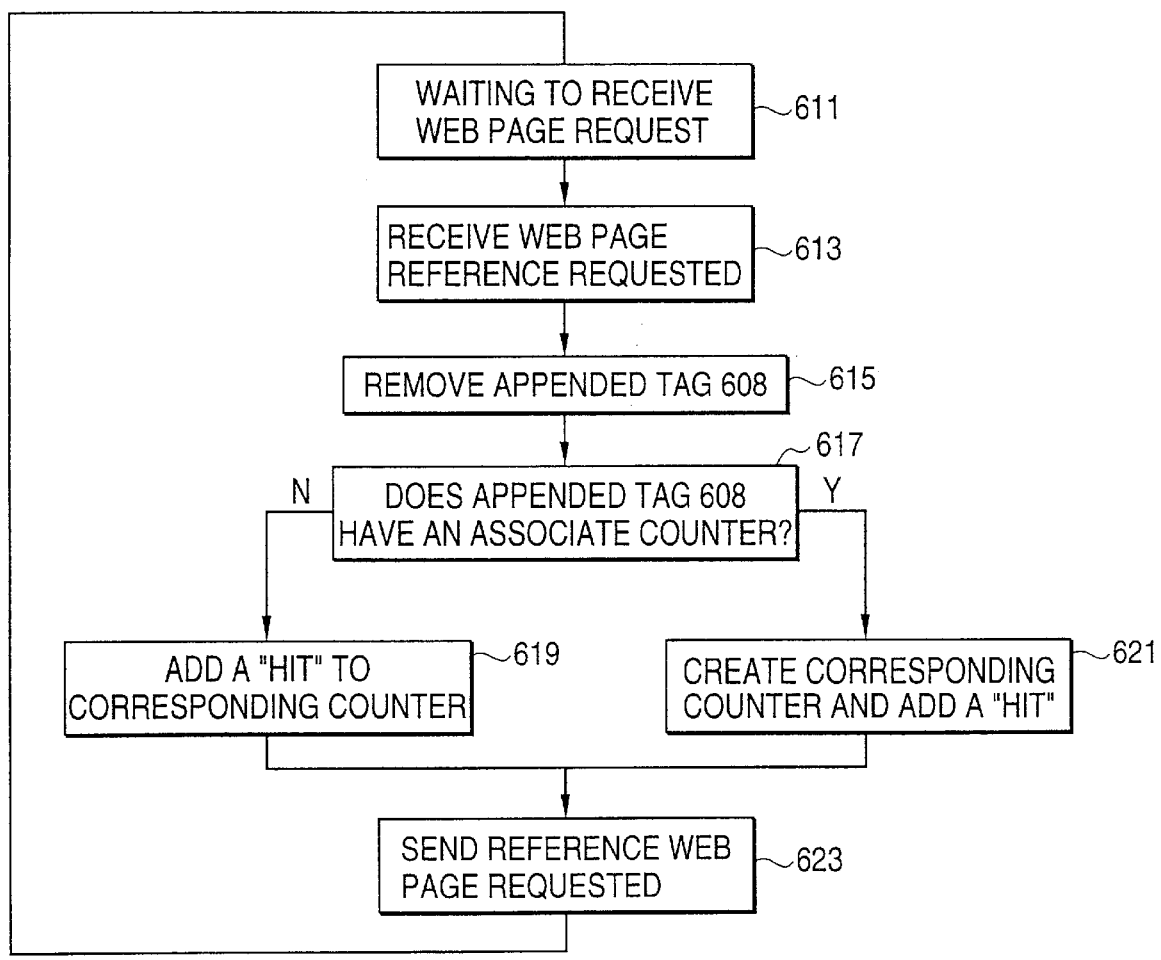
FIG. 6 is an illustration of the present invention reference link. In addition, the associated process flow of the present invention HTML code is illustrated.

FIG. 6 is an illustration of the present invention reference link for referencing an advertiser's Web site using HTML code 600. In addition, the associated process flow 610 of the present invention HTML code is illustrated. Reference Web site 607 includes an appended tag1 (608). Again, a simplified process flow chart 610 of an application program 315 in FIG. 3 running on Advertiser's Web page server 101 of FIG. 1 is shown. As in FIG. 5, the reference Web page requested (steps 611, 613, 623) is sent to user system 109 and rendered through Web browser 111. Process flow chart 610 includes a step 615 to remove appended tag 608. The process step 615 of removing tag 608 on Server 110 is well understood in the art. In this tag embodiment, an application 315 running on Advertiser's Web page server 101 strips off anything after the top level domain name string www.bike_sales.com 607. Using the strip off tag, the Web server application 315 in process step 617 determines if tag 608 has already been assigned a corresponding counter. When a counter corresponding to tag 608 has been assigned, the server application 315 just increments the number of "hits" in the counter in process step 619. On the other hand if a counter corresponding to tag 608 has not been assigned, server application step 621 creates a corresponding counter and sets the counter value to one. It should be noted that the counters created by server application 315 can be any software counter or a software counter record in a database entry as directed by server application 315 (not shown). Any time the advertiser desires to learn the effectiveness of an advertisement, it can just examine the counter value associated with a given tag.

In the Web, or any network where each node is identified by an unique address, tag 608 is a sub-address and in the case of the Web, it is a part of an URL address. An advertiser can assign a different tag 608, sub-address, or string to each of several different Web sites running their advertisements. For example suppose advertiser A advertises on five different Web sites (e.g. referring Web site 1, referring Web site 2, referring Web site 3, referring Web site 4, referring Web site 5) simultaneously. Each of these five Web sites can be assigned a unique URL tag 608 (or sub-address, e.g. tag1, tag2, tag3, tag4, tag5) to identify the respective site. This enables the advertiser to tabulate the effectiveness of its advertisement among all five sites running their advertising by examining the unique counters associated with each Web site's unique URL tag 608. The number of hits in each unique counter can be compared with the advertiser's cost to place the advertisement on a particular Web site. The advertiser can now accurately gauge how best to disburse its advertising budget among the various Web sites.

It should be appreciated that this method is completely independent of any reporting requirements by the owner of the Web page on which the advertisement was placed. In addition, when using a third party advertising agency, the company wishing to have its advertisements displayed, does not need to communicate with the advertising agency to review the effectiveness of the advertisement. Instead the number of advertising "hits" is tabulated directed by the company advertising itself.

There are a variety of methods to add an unique tag 608 to a URL in order to provide a distinct reference to a particular Web site. Several different alternative embodiments are shown. It is important to point out that a wide variety of methods exist for adding unique identifying tag 608 information to a URL which is within the true spirit and scope of this present invention.

FIG. 7 is an illustration of an alternate embodiment of FIG. 6 for HTML code 600 used to reference a Web site according to the present invention. In this embodiment, instead of using a reference tag 608, as done in FIG. 6, the reference tag 708 is enclosed by a prefix string 707 alias and a suffix string 709 unalias. Here any desirable prefix and suffix string pair can be used to delineate by enclosing the reference tag 708. As in FIG. 6, the reference string is removed by server application program 315, but in this embodiment the string is enclosed by a prefix string 708 and a suffix string 709.

FIGS. 8 and 9 show alternative embodiments for using the reference tag 608. In FIG. 8 there is appended a reference Web page 808 www.source.com that is functionally equivalent to reference tag 608 in FIG. 6. The embodiment in FIG. 9 shows reference Web page location such as main.html 908 and top.html 909 wherein a party examining the underlying HREF URL gets the illusion that the tag is part of the URL of the main advertiser's site, but in fact is the reference tags 908 and 909 are stripped off by application program 315 as previously discussed. The use of an illusionary tag 908 and illusionary tag 909 may be important in situations where a Web page designer has the responsibility to integrate third party advertisement on a Web site along with the advertiser's corresponding Web URL. In general, Web designers prefer to link to the top level or main Web URL of an advertiser. Therefore a Web page designer may be tempted to omit the use of any reference tags or any other extraneous tags and instead insert a directly reference to the main Web page of the advertiser. To minimize this temptation on the part of Web designers, the use of illusionary tags lead the Web page designer to think the top URL address is being referenced even though the accompanying reference tags are unique to the Web designer's site. Therefore, the Web page designer has the illusion of inserting a direct reference to the advertiser's main site even though it contains a reference tag 908 or 909. It is important to note than many other illusionary tag strings can be constructed including bottom, left, right, main1, main2 to extend the possible number of reference sites accordingly.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. In a network comprising a plurality of nodes wherein each node is identified by a unique address and each node comprises the capability for including sub-addresses, a method on an advertiser's node, which is independent of one or more referring nodes, the method for determining the identity of one or more referring nodes that are delivering one or more web pages to one or more end-user systems, wherein the web pages include advertisements with a link based upon an address to the advertiser's node, the method comprising the steps of:

receiving a request for an address on an advertiser's node, the request based upon the selection of the address by an end-user using an end-user system for browsing one or more web pages being presented on the end-user system by one or more referring nodes, the request including a request for a sub-address within the advertiser's node and wherein request is independent of the one or more referring nodes so that there is no requirement to receive a referring address from the one or more referring nodes and there is no requirement to retrieve advertisment for the one or more web pages from the advertiser's node;

removing the sub-address from the request;

comparing the sub-address located within the advertiser's node received with a list of sub-addresses located within the advertiser's node, at least one of the sub-addresses in the list corresponding to the one or more referring nodes; and determining each one or more referring nodes corresponding to the sub-address located within the advertiser's node based on the comparison.

2. The method of claim 1 wherein the step of receiving a request comprises receiving a request for a Web site in the World-Wide-Web and wherein the request comprises an extension of the address for the Web site.

3. The method of claim 2 wherein the step of removing the sub-address from the request comprises removing the extension.

4. The method of claim 3 wherein the step of comparing the sub-address received with a list of sub-addresses comprises comparing the extension with a list of extensions and referring entities wherein each referring entity in the list corresponds to an extension listed therein.

5. The method of claim 4 wherein the step of determining the referring entity comprises determining the referring entity corresponding to the request for a web site based on the comparison.

6. The method of claim 1 further comprising the following step preceding the comparison step:

storing a list of sub-addresses, each corresponding to a referring entity.

7. The method of claim 6 wherein the storing step comprises:

storing a list of Web address extensions, each corresponding to a referring entity.

8. The method of claim 1 further comprising the step of counting the number of removed extensions for each referring source.

9. The method of claim 5 further comprising the step of counting the number of removed extensions for each referring source.

10. A computer readable medium comprising instructions on an advertiser's node, which is independent of one or more referring nodes, for determining the identity of one or more referring nodes in a network, the one or more referring nodes delivering one or more web pages to one or more end-user systems, wherein the web pages include advertisements with a link based upon an address to the advertiser's node, the network comprising a plurality of nodes wherein each node is identified by a unique address and each node comprises the capability for including sub-addresses, comprising the instructions of:

receiving a request for an address on an advertiser's node, the request based upon the selection of the address by an end-user using an end-user system for browsing one or more web pages being presented on the end-user system by one or more referring nodes, the request including a request for a sub-address within the advertiser's node and wherein request is independent of the one or more referring nodes so that there is no requirement to receive a referring address from the one or more referring nodes and there is no requirement to retrieve advertisment for the one or more web pages from the advertiser's node;

removing the sub-address from the request;

comparing the sub-address located within the advertiser's node received with a list of sub-addresses located within the advertiser's node, at least one of the sub-addresses in the list corresponding to the one or more referring nodes; and determining each one or more referring nodes corresponding to the sub-address located within the advertiser's node based on the comparison.

11. The method of claim 10 wherein the step of receiving a request comprises receiving a request for a Web site in the WORLD-WIDE-WEB and wherein the request comprises an extension of the address for the Web site.

12. The method of claim 11 wherein the step of removing the sub-address from the request comprises removing the extension.

13. The method of claim 12 wherein the step of comparing the sub-address received with a list of sub-addresses comprises comparing the extension with a list of extensions and referring entities wherein each referring entity in the list corresponds to an extension listed therein.

14. The method of claim 13 wherein the step of determining the referring entity comprises determining the referring entity corresponding to the request for a web site based on the comparison.

15. The method of claim 10 further comprising the following step preceding the comparison step:

storing a list of sub-addresses, each corresponding to a referring entity.

16. The method of claim 14 wherein the storing step comprises:

storing a list of Web address extensions, each corresponding to a referring entity.

17. The method of claim 10 further comprising the step of counting the number of removed extensions for each referring source.

18. The method of claim 14 further comprising the step of counting the number of removed extensions for each referring source.

19. An information processing system for determining the identity of one or more referring nodes in a network, the information processing system coupled to a plurality of nodes wherein each node is identified by a unique address and each node comprises the capability for including sub-addresses, the information processing system comprising:

means for receiving a request for an address on an advertiser's node, the request based upon the selection of the address by an end-user using an end-user system for browsing one or more web pages being presented on the end-user system by one or more referring nodes, the request including a request for a sub-address within the advertiser's node and wherein request is independent of the one or more referring nodes so that there is no requirement to receive a referring address from the one or more referring nodes and there is no requirement to retrieve advertisment for the one or more web pages from the advertiser's node;

means for removing the sub-address from the request;

means for comparing the sub-address located within the advertiser's node received with a list of sub-addresses located within the advertiser's node, at least one of the sub-addresses in the list corresponding to the one or more referring nodes; and means for determining each one or more referring nodes corresponding to the sub-address located within the advertiser's node based on the comparison.

20. The informational processing system of claim 19 wherein the means for of receiving a request comprises receiving a request for a Web site in the World-Wide-Web and wherein the request comprises an extension of the address for the Web site.

21. The information processing system of claim 20 wherein the means for removing the sub-address from the request comprises removing the extension.

22. The information processing system of claim 21 wherein the means for comparing the sub-address received with a list of sub-addresses comprises comparing the extension with a list of extensions and referring entities wherein each referring entity in the list corresponds to an extension listed therein.

23. The information processing system of claim 22 wherein the means of determining the referring entity comprises means for determining the referring entity corresponding to the request for a web site based on the comparison.

24. The information processing system of claim 19 wherein the means for comparing comprises:

means for storing a list of sub-addresses, each sub-address corresponding to a referring entity.

25. The information processing system of claim 24 wherein the storing means comprises:

means for storing a list of Web address extensions, each corresponding to a referring entity.

26. The information processing system of claim 19 further comprising the means for counting the number of removed extensions for each referring source.

27. The information processing system of claim 23 further comprising the means for counting the number of removed extensions for each referring source.

* * * * *